Jan. 24, 1956  C. S. R. STOCK  2,732,037
HYDRAULIC DAMPER WITH ADJUSTABLE VALVES
Filed Feb. 15, 1952  3 Sheets-Sheet 1

INVENTOR
CHARLES SAMUEL ROBERTS STOCK
by Walter S. Pleston
ATTORNEY

Jan. 24, 1956  C. S. R. STOCK  2,732,037
HYDRAULIC DAMPER WITH ADJUSTABLE VALVES
Filed Feb. 15, 1952  3 Sheets-Sheet 2

INVENTOR
CHARLES SAMUEL ROBERTS STOCK
by Walter S. Pleston
ATTORNEY

Jan. 24, 1956 C. S. R. STOCK 2,732,037
HYDRAULIC DAMPER WITH ADJUSTABLE VALVES
Filed Feb. 15, 1952 3 Sheets-Sheet 3

INVENTOR
CHARLES SAMUEL ROBERTS STOCK
by Walter S. Pleston
ATTORNEY

# United States Patent Office 2,732,037
Patented Jan. 24, 1956

2,732,037

HYDRAULIC DAMPER WITH ADJUSTABLE VALVES

Charles Samuel Roberts Stock, Shirley, near Birmingham, England, assignor to Girling Limited, Birmingham, England, a British company Application February 15, 1952, Serial No. 271,661

Claims priority, application Great Britain February 16, 1951

7 Claims. (Cl. 188—88)

This invention relates to improvements in hydraulic dampers or shock-absorbers of the piston type in which a double-ended piston is adapted to reciprocate in a cylinder closed at each end, the cylinder usually being mounted on the chassis of a vehicle and the piston being actuated by an arm on an angularly movable shaft carrying a lever which is connected to the vehicle axle. Movement of the piston in either direction displaces liquid from one end of the cylinder to the other through transfer passages controlled by spring-loaded valves. These passages are commonly formed in a member housed in a bore in the body of the damper parallel to the cylinder and the ends of the bore have to be sealed against the working pressure which may have a very high value.

According to my invention, in an hydraulic damper or shock-absorber of the type set forth the valves controlling the passage of liquid between opposite ends of the cylinder are arranged in a separate housing or member which is mounted within a recuperation chamber in the body of the damper or shock-absorber from which make-up liquid can pass to the working spaces.

Communication between the ends of the cylinder and the valve housing is conveniently established by inclined passages drilled in the body of the damper and leading into recesses around set-screws by which the valve housing is secured to the body of the damper, the housing and body having co-operating machined faces or seatings around the recesses. No washers or other sealing means are required as if there should be any leakage the liquid will simply pass into the recuperation chamber.

In an alternative arrangement the passages in the body lead into recesses or blind bores in the valve housing which are independent of the screw or screws by which the housing is secured in position, the recesses in the housing communicating with bores in which the valves are mounted.

As the housing incorporating the bores forming the transfer passages and the valves is a separate unit it can be completely assembled and the valves and bleeds can be preset before the housing is fitted into the damper.

Means are provided for adjusting the setting of the valves and for adjusting the usual bleed passages, and on removal of the cover or closure for the recuperation chamber these adjustments are readily accessible so that the setting of each valve or bleed can be changed without loss of liquid while the damper is on a vehicle or on a testing machine.

The transfer of liquid under pressure from one end of the cylinder to the other takes place through passages which lie wholly within the damper body and through the bores in the housing which is enclosed in the recuperation chamber so that joints through which high pressure liquid might leak to atmosphere are entirely eliminated.

Two practical hydraulic dampers incorporating my invention are illustrated by way of example in the accompanying drawings in which.

Figure 1:
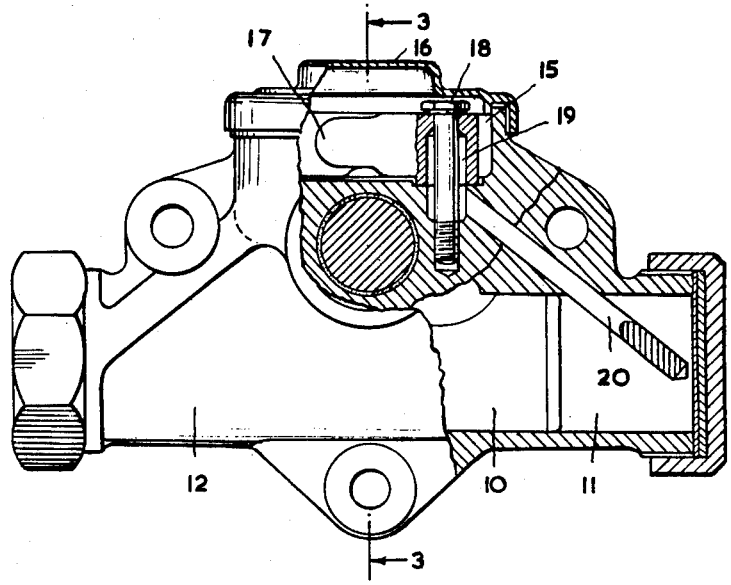
Figure 1 is a side elevation in part section of a damper.
Figure 3:
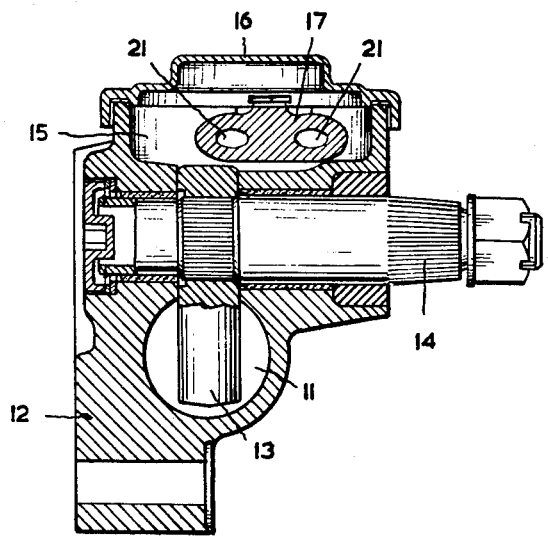
Figure 3 is a vertical section on the line 3—3 of Figure 1.
Figure 2:
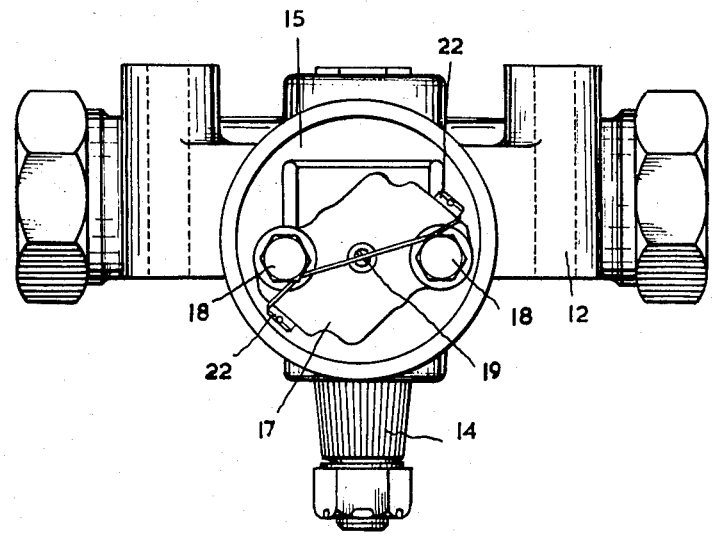
Figure 2 is a plan of the damper with the cover of the recuperation chamber removed.
Figure 4:
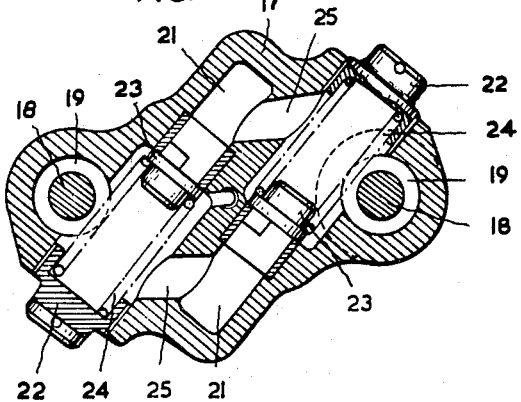
Figure 4 is a horizontal section on a larger scale through the housing for the valves controlling the transfer of liquid.

Both of the hydraulic dampers illustrated are of the known type comprising a double-ended piston 10 working in a cylinder 11 in a body 12. The body is adapted to be mounted on the chassis of a vehicle and the piston is actuated by an arm 13 on a shaft 14 mounted for angular movement in the body and carrying an external lever arm (not shown) adapted to be connected to the vehicle axle.

A recess 15 of substantial dimensions in the upper part of the body forms a reservoir or recuperation chamber for the oil or other liquid with which the cylinder is filled. The recuperation chamber normally on top closed by a screwed cap or cover 16 is connected in the conventional manner to the working spaces of the cylinder by passages not shown so that make-up liquid can pass to the working spaces as stated hereinbefore. For a showing of such a conventional connection between the working spaces and recuperation chamber, see U. S. Patent 2,013,904.

In the form of my invention shown in Figures 1 to 5 the bottom of the recuperation chamber has a machined surface against which a housing 17 is held by set-screws 18. Recesses 19 of greater diameter than the set-screws are machined in the body and the housing 17 around the central parts of the set-screws and these recesses are connected by inclined passages 20 in the body to opposite ends of the cylinder 11.

In the housing 17 there are two parallel oppositely directed blind bores 21, 21 each of which is intersected by one of the recesses 19 so that liquid from one end of the cylinder can pass freely into that bore. The bores are closed at their outer ends by screwed plugs 22. Each bore is stepped in diameter and the shoulder at the step forms a seating for a valve 23 which is normally held closed by a compression spring 24 interposed between the valve and the plug 22. The plug 22 is adjustably screwed into the outer end of the bore so that by screwing it in or out the loading of the valve can be adjusted as required.

The closed end of each bore is connected by a transverse passage 25 in the housing to the part of the other bore between the valve and the closure plug so that liquid displaced from one end of the cylinder 11 under pressure sufficient to open a valve 23 in one bore can pass through to the other bore and so to the other end of the cylinder.

Figure 5:
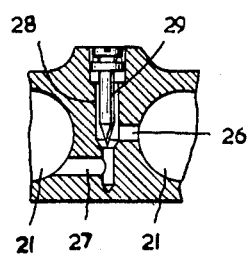
Figure 5 is a fragmentary section showing the arrangement of the bleed screw.

The parts of the two bores 21, 21 between the valves and the closure plugs are also connected by a bleed passage through which liquid can flow at a slow and predetermined rate when the valves are closed. This bleed passage, as shown in Figure 5, comprises ports 26 and 27 leading out of the bores 21, 21 into a vertical bore 28 containing a seating located between the ports and controlled by a screw-down needle valve 29.

In an alternative arrangement there is a separate controlled bleed passage between each of the bores 21, 21 and the recuperation chamber.

The head of the needle valve 29 lies in a recess in the top of the housing 17 and the heads of the screwed plugs 22 project from the ends of the housing so that on removal of the cover 16 adjustment of the setting of the bleed and of the valves can be readily effected without disturbing anything else.

Figure 6:
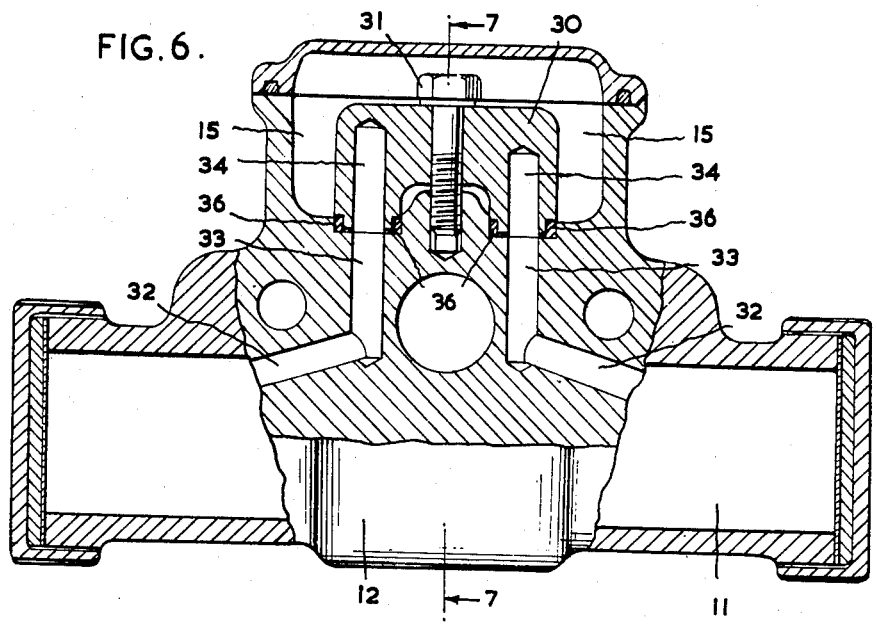
Figure 6 is a side elevation in part section of another damper.
Figure 7:
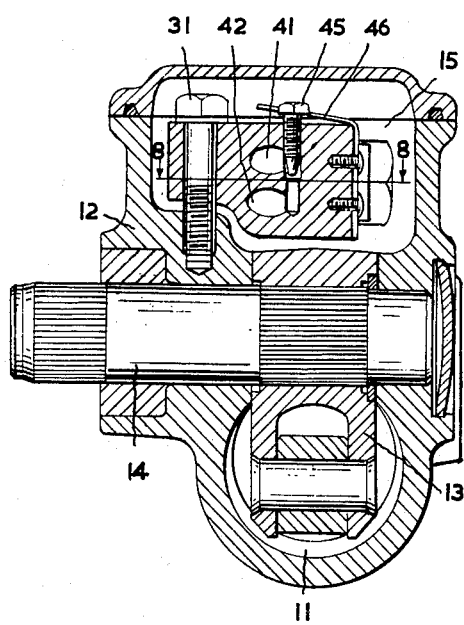
Figure 7 is a transverse vertical section on the line 7—7 of Figure 6.
Figure 8:
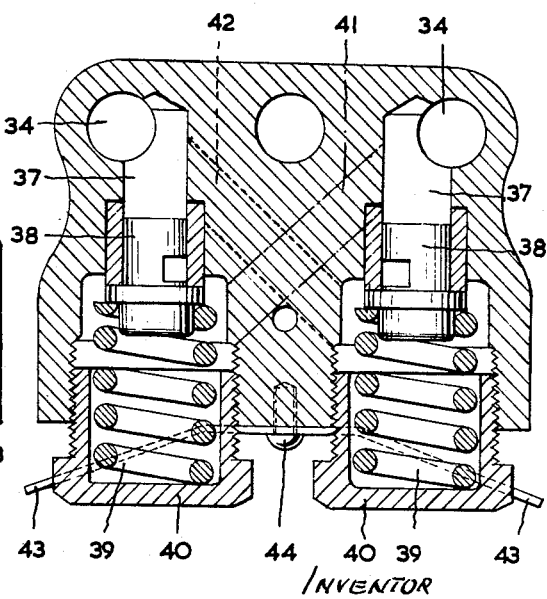
Figure 8 is a horizontal section on a larger scale of the valve housing alone, the section being taken on the line 8—8 of Figure 7.

In the alternative construction shown in Figures 6, 7 and 8 the valve housing 30 is secured against the bottom of the recuperation chamber 15 by a single setscrew 31 passing vertically through the housing. Inclined passages 32 drilled in the body from opposite ends of the cylinder lead into vertical drillings 33 in alignment with vertical recesses 34 drilled into the housing 30 from its base.

Spigots 35 on the base of the housing around the recesses 34 are received in complementary counter-bores in the body and are sealed by packing washers 36. The upper ends of the recesses 34 respectively intersect horizontal parallel blind bores 37 in the housing in which the valves 38 are mounted. The valves are loaded by compression springs 39 abutting between the valves and plugs 40 which are adjustably screwed into the ends of the bores 37 to allow the loading of the valves to be adjusted. Opposite ends of the bores 37 are cross-connected by oppositely inclined and vertically staggered passages 41, 42. This arrangement permits both of the plugs 40 to be located on the same side of the housing, and the plugs are locked in their adjusted positions by a resilient detent plate 43 which is secured to the housing by a screw 44. The bores 37 are also connected by a bleed passage controlled by a needle valve 45 which is locked in its adjusted position by a spring detent 46.

I claim:

1. An hydraulic damper comprising, in combination, a damper body defining a piston cylinder closed at its ends and a recuperation chamber from which make-up liquid can pass to the working spaces, said damper being adapted to be mounted for use in a position where the recuperation chamber is above the piston cylinder, a valve housing formed separately from the damper body and detachably secured within and against a wall of the recuperation chamber, means in said damper body and housing establishing communication between opposite ends of the cylinder, adjustable valves in said housing controlling said means, and a removable cover for the recuperation chamber which, when removed, exposes the valve housing and enables adjustment of the valves and removal of the housing to be effected without loss of liquid while the damper is mounted for use.

2. An hydraulic damper comprising, in combination, a damper body defining a piston cylinder closed at its ends and a recuperation chamber from which make-up liquid can pass to the working spaces, said damper being adapted to be mounted for use in a position where the recuperation chamber is above the piston cylinder, a valve housing formed separately from the damper body, a machined seating on the bottom of said recuperation chamber, screw bolts detachably securing said housing on said seating within the chamber, recesses defined by said valve housing and surrounding said screw bolts, bores in said housing establishing communication between said recesses, transfer passages in said damper body establishing communication between said recesses and opposite ends of the cylinder, spring-loaded adjustable valves in said bores controlling the passage of liquid from opposite ends of the cylinder, and a cover on the chamber which, when removed, exposes the valve housing.

3. An hydraulic damper comprising, in combination, a damper body defining a piston cylinder closed at its ends and a recuperation chamber from which make-up liquid can pass to the working spaces, said damper being adapted to be mounted in a position of use where the recuperation chamber is above the cylinder, a machined seating on a wall of the recuperation chamber, a valve housing formed separately from said damper body and detachably secured to said body on said seating and within the chamber, transfer passages leading from opposite ends of the cylinder to the seating which is penetrated by the passages at spaced points covered by the valve housing, means in said housing establishing communication between said transfer passages where they penetrate the seating, spring-loaded valves in said housing controlling the passage of liquid between opposite ends of the cylinder via said transfer passages and means in the housing, and a removable cover on the chamber which, when removed, exposes the valve housing and enables adjustment of the valves and removal of the housing to be effected without loss of liquid while the damper is mounted for use.

4. An hydraulic damper comprising, in combination, a damper body defining a piston cylinder closed at its ends and a recuperation chamber from which make-up liquid can pass to the working spaces, said damper being adapted to be mounted in a position of use where the recuperation chamber is above the piston cylinder, a valve housing formed separately from the damper body and mounted on a wall of said recuperation chamber, two blind bores in said housing, a spring-loaded valve in each bore, co-operating transfer passages in the body of the damper and the housing connecting one end of each bore with one end of the damper cylinder, and means in the housing establishing communication between the end of each bore which is connected with one end of the cylinder and the end of the other bore remote from the end which is connected to the other end of the cylinder.

5. An hydraulic damper as in claim 4 comprising a seating in each bore intermediate the passages connecting the bore to one end of the damper cylinder and to the other bore respectively, said valve in each bore co-operating with said seating, a plug adjustably screwed into and closing the open end of said bore, and said spring loading said valve being a compression spring normally holding said valve in engagement with said seating and backed by said plug, a cover for the recuperation chamber, the plug being accessible for adjustment of the valve loading on removal of the cover for the recuperation chamber.

6. An hydraulic damper as in claim 4 comprising a bleed passage connecting said bores for the flow of liquid between the bores at a low rate when the valves are closed, and an adjustable needle valve controlling said bleed passage, a cover for the recuperation chamber, said needle valve being accessible for adjustment on removal of the cover for the recuperation chamber.

7. An hydraulic damper as in claim 4 comprising a machined surface in said recuperation chamber, two spaced set-screws passing through said valve housing into the damper body to secure said housing against said surface, and aligned recesses in said housing and damper body around the central part of each set-screw, the recesses around each set-screw forming part of said transfer passage connecting one end of the damper cylinder to one of said bores in the housing.

References Cited in the file of this patent

UNITED STATES PATENTS

| | | |
|---|---|---|
| 1,067,444 | Scott | July 15, 1913 |
| 1,828,394 | Chryst | Oct. 20, 1931 |
| 1,989,498 | Rossman | Jan. 29, 1935 |
| 2,003,399 | Tamsitt | June 4, 1935 |
| 2,013,904 | Whitted | Sept. 10, 1935 |
| 2,604,953 | Campbell | July 29, 1952 |
| 2,605,861 | De Loe | Aug. 5, 1952 |